M. J. HARRISON.
VINE CUTTER.
APPLICATION FILED JULY 19, 1916.
1,222,946.　　　　　　　　　　　Patented Apr. 17, 1917.
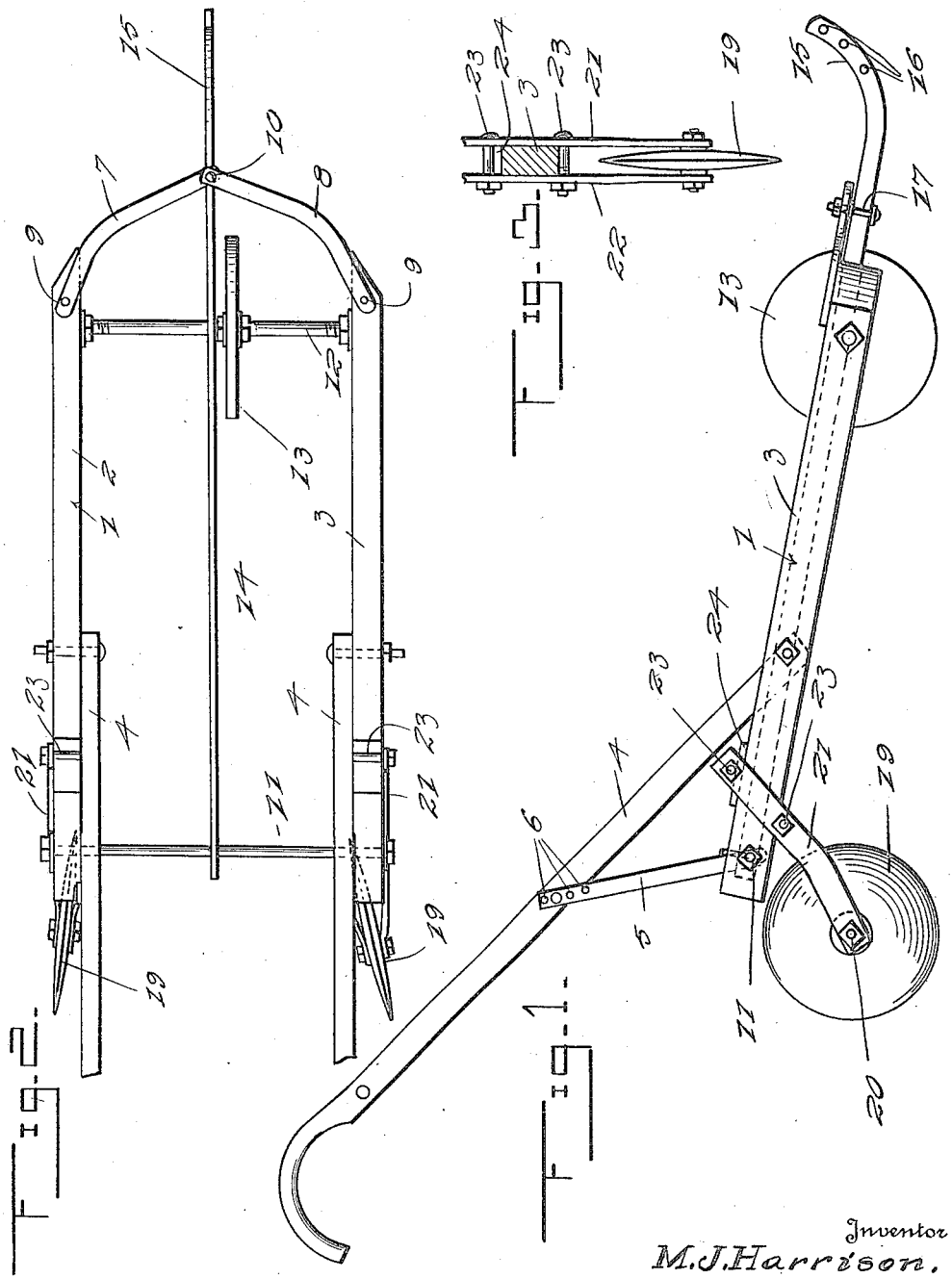
Inventor
M.J.Harrison.

UNITED STATES PATENT OFFICE.

MATHEW J. HARRISON, OF WHIGHAM, GEORGIA.

VINE-CUTTER.

1,222,946.  Specification of Letters Patent.  Patented Apr. 17, 1917.

Application filed July 19, 1916. Serial No. 110,257.

*To all whom it may concern:*

Be it known that I, MATHEW J. HARRISON, a citizen of the United States, residing at Whigham, in the county of Grady and State of Georgia, have invented certain new and useful Improvements in Vine-Cutters; and I do hereby declare the following to be a full, clear, and exact description of the invention, such as will enable others skilled in the art to which it appertains to make and use the same.

This invention relates to a device constructed for cutting vines, such as potato vines, peanut vines or the like, and the primary object of the invention is to provide a vine cutter as specified which includes a supporting frame having a pair of rotary cutting disks carried by the rear end of the same in spaced relation to each other, and a supporting wheel carried by the front end of the cutter.

Another object of this invention is to provide a hitch which is connected to suitable cross supporting rods of the frame, and extends forwardly therefrom.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a side elevation of the improved vine cutter.

Fig. 2 is a top plan view of the vine cutter having parts broken away, and

Fig. 3 is a fragmentary section through the vine cutter.

Referring more particularly to the drawing, 1 designates the supporting frame of the vine cutter as an entirety, which includes side rails 2 and 3. Handles 4 of the ordinary construction are connected to the side rails 2 and 3 in the usual manner and are braced by suitable braces 5, which braces are provided with a plurality of spaced openings 6, to permit of the adjusting of the height of the handles 4 with respect to the frame 1.

The side rails 2 and 3 have bars 7 and 8 pivotally connected to their front ends as shown at 9, which bars extend forwardly and inwardly toward each other and have their forward ends connected as shown at 10. A cross rod 11 is carried by the rear end of the frame 1 and it braces the side rails 2 and 3, as well as forming means for attaching the lower ends of the braces 5 to the frame 1. A rod 12 is carried by the front end of the frame 1 and it has a supporting wheel 13 rotatably mounted thereon for supporting the front end of the frame 1.

A hitch bar 14 is provided which has its rear end attached to the rod 11. The hitch bar 14 extends about the rod 12 and its forward end 15, which projects forwardly of the arms 7 and 8 is bent or turned upwardly and provided with a plurality of openings 16 through the medium of which a swingletree may be attached to the vine cutter. The hitch bar 14 is supported against lateral movement by bolts 17 which extend downwardly through the bars 7 and 8 and engage the hitch bar 14 upon each side of the same.

A rotary cutting disk 19 is carried by the rear end of each of the side rails 2 and 3. The cutting disk 19 is rotatably supported by a suitable bolt or axle 20 which is connected to the lower end of bars 21 and 22. The bars 21 and 22 engage the side of the side rails 2 and 3 of the frame 1 and are held in frictional engagement therewith by means of bolts 23 which extend through the bars 21 and 22 as clearly shown in the drawing. A wedge block 24 is mounted upon the upper surface of each of the side rails 2 and 3 and beneath the upper bolts 23 for facilitating the quick and easy adjustment of the position of the cutting disk along the frame. In Fig. 1 of the drawing, the disks 19 are shown disposed obliquely to the line of travel of the supporting frame 1, so as to engage the vines in an angled manner for efficiently cutting them so that the vines may be removed from the surface of the field prior to the digging of the potatoes, peanuts or the like.

In reducing the invention to practice, certain minor features of construction, combination and arrangement of parts may necessitate alterations to which the patentee is entitled provided such alterations are comprehended within the scope of what is claimed.

What is claimed is:—

1. In a vine cutter, a supporting frame, a supporting wheel rotatably supported a short distance rearwardly of the forward end of said supporting frame, said supporting frame including a pair of side bars, a pair of metallic bars held in binding engagement with portions of the sides of said side bars adjacent to their rear ends, and vine cutting disks rotatably carried by said metallic bars and positioned at slight angles with respect to the direction of travel of the vine cutter.

2. In a vine cutter, a supporting frame, a supporting wheel rotatably supported a short distance rearwardly of the forward end of said supporting frame, said supporting frame including a pair of side bars, a pair of metallic bars held in binding engagement with portions of the sides of said side bars adjacent to their rear ends, and vine cutting disks rotatably carried by said metallic bars and positioned at slight angles with respect to the direction of travel of the vine cutter, a pair of bars connected to the front ends of said rails and extending inwardly toward each other and forwardly from the ends of the side rails, a bracing rod carried by the rear end of said side rails, and a hitch bar connected to said bracing rod and extending forwardly therefrom, the front end of said hitch bar projecting beyond the front ends of said forwardly extending bars, and means for connecting said hitch bar to said forwardly extending bars.

In testimony whereof I affix my signature in presence of two witnesses.

MATHEW J. HARRISON.

Witnesses:
C. F. REHBERG,
J. W. DAVIS.

Copies of this patent may be obtained for five cents each, by addressing the "Commissioner of Patents, Washington, D. C."